United States Patent

Silverman et al.

[11] Patent Number: 5,915,661
[45] Date of Patent: Jun. 29, 1999

[54] COLLAPSIBLE DESK STAND FOR PORTABLE COMPUTER

[75] Inventors: Ira Silverman, San Jose; Stanislav Moiseyenko, San Francisco, both of Calif.

[73] Assignee: Fujitsu Limited, Japan

[21] Appl. No.: 08/910,566

[22] Filed: Aug. 1, 1997

[51] Int. Cl.⁶ ................................................. F16M 11/00
[52] U.S. Cl. .................. 248/465.1; 248/454; 248/456
[58] Field of Search .................. 248/454, 456, 248/460, 461, 465.1, 153, 175, 918

[56] References Cited

U.S. PATENT DOCUMENTS

| | | | |
|---|---|---|---|
| D. 317,910 | 7/1991 | Hawkins et al. | D14/100 |
| 1,953,527 | 4/1934 | Bentley . | |
| 3,171,687 | 3/1965 | Jensen | 248/456 X |
| 3,376,009 | 4/1968 | Domino | 248/456 |
| 4,467,727 | 8/1984 | Strommer | 248/456 X |
| 4,474,352 | 10/1984 | Nishi | 248/456 |
| 4,618,119 | 10/1986 | Powell | 248/456 |
| 4,635,893 | 1/1987 | Nelson | 248/558 |
| 4,657,214 | 4/1987 | Foster | 248/176 |
| 4,717,112 | 1/1988 | Pirkle | 248/639 |
| 4,832,419 | 5/1989 | Mitchell et al. | 312/7.2 |
| 5,035,393 | 7/1991 | Menaged | 248/436 |
| 5,100,098 | 3/1992 | Hawkins | 248/917 |
| 5,141,196 | 8/1992 | Arnold et al. | 248/397 |
| 5,212,628 | 5/1993 | Bradbury | 361/395 |
| 5,283,714 | 2/1994 | Tsai et al. | 361/683 |
| 5,345,362 | 9/1994 | Winkler | 361/681 |
| 5,362,025 | 11/1994 | Trom et al. | 248/670 |
| 5,419,525 | 5/1995 | Hilton | 248/371 |
| 5,445,266 | 8/1995 | Prete et al. | 206/320 |
| 5,552,947 | 9/1996 | Brown et al. | 361/638 |
| 5,607,135 | 3/1997 | Yamada | 248/454 X |

*Primary Examiner*—Ramon O. Ramirez
*Attorney, Agent, or Firm*—Skjerven, Morrill, MacPherson, Franklin & Friel LLP; Norman R. Klivans

[57] ABSTRACT

A collapsible desk stand for a portable computer allows variation in viewing angles of the computer display, and the ability to connect the portable computer to external, peripheral devices. The portable computer can be positioned on the stand to allow easier access to its keyboard (input tables) so that both right-handed and left-handed persons can position the portable computer so that data entry is most convenient. The stand is stable and includes a feature to allow it to be locked in its collapsed position. A fully adjustable handstrap assembly also for the portable computer is usable with the desk stand.

5 Claims, 6 Drawing Sheets

5,915,661

COLLAPSIBLE DESK STAND FOR PORTABLE COMPUTER

BACKGROUND OF THE INVENTION

1. Field of the Invention

This disclosure relates to portable computers; in particular, to a stand that allows a hand-held computer to be propped up for the users' convenience to view the computer display and to be easily connected to peripheral devices, and to a hand strap assembly for such a portable computer.

2. Description of Related Art

The need for computer stands has long been apparent. See copending and commonly owned U.S. patent application Ser. No. 08/619,818, filed Mar. 15, 1996, entitled "Stand for a Portable Computer", Ira Silverman, showing a stand for a portable computer as shown in present FIG. 1. This stand is intended for a portable computer, e.g. a pen-based hand-held computer, but not so limited, and allows the computer to be positioned at various angles and orientations (portrait and landscape) relative to the user, and additionally allows the computer to be connected to external peripheral devices via a docking port. This stand allows the user to locate the data entry (tablet or keyboard) portion of the computer near to either the user's left or right hand. In addition, the stand allows such a hand-held computer to be used also for desktop purposes.

The stand includes a horizontal base, which rests on a surface such as a desk; a frame hingedly connected to the base, the computer being hung on the frame which can be propped at various angles relative to the base; and a support which props up the frame relative to the base. The stand folds flat along the hinge so that it can be easily transported. The angle of the support relative to the base determines the viewing angle of the computer on the frame.

In accordance with one version of this device an adaptor plate detachably hangs by a flange from the frame; the adaptor plate is mounted to the computer docking port, to which the computer is conventionally made. The docking port further provides a conventional electrical connection between the computer and external, peripheral devices by cable. In another embodiment of this device there is no adaptor plate and instead the docking port or the computer itself includes, on a rear surface, protruding hooks or flanges or equivalent members which thereby allow the computer or docking-port computer combination to hang from the frame member.

The present FIG. 1 is identical to FIG. 7 of the above-referenced patent application illustrating the desk stand itself, without the computer, docking port or adaptor plate. These elements are shown in other figures of that patent application and hence not replicated herein. The desk stand is a relatively simple device made e.g. of metal, such as heavy gauge wire. It includes the base which includes member 2 at the front of the base. Mounted on either side of the base are adjustment plates 20*a* and 20*b* defining respectively holes 4 and slots 6 which accommodate respectively legs 18*a* and 18*b* of the frame 10. The frame 10 defines bends 36*a* and 36*b* although these are not necessary. The upper bar of frame 10 is member 10*c;* the lower portion of frame 10 is member 30. Frame 10 is propped up in the upright position is shown in FIG. 1 by supports 8*a* and 8*b* which are coupled at their lower portion to the stiffener 32, and their upper portion of which rests on pivot pins respectively 28*a* and 28*b* which are part of frame 10. Washers 34*a* and 34*b* are on the pivot pins 28*a* and 28*b*. Adjustment plate 20*a* further defines a hole 22*a* in which a support leg 24*a* of support member is inserted. The base rests on feet 39.

While this desk stand performs its function effectively, it has been determined that certain improvements are possible and the present application is directed to such improvements.

SUMMARY

The desk stand of FIG. 1 has been improved in several respects as disclosed herein. First, the bends 36*a*, 36*b* of FIG. 1 are eliminated. They are not needed in certain embodiments since they were intended to accommodate a computer having handles on its rear surface.

Next, the rear feet (at the back of the base of the stand) are modified in terms of their function so that in the collapsed position the upper cross bar member of the frame bears against one or both of these feet. Thus a tight fit in the stand's collapsed position between the upper cross bar and the feet at the rear of the base allows locking of the frame against the base in the collapsed position.

The adjustment plates are modified so that, rather than being in front of the frame (on the front part of the base), instead they are behind the frame, towards the rear of the base. This is sturdier since it results in greater distance between the pivots of the frame on the base and the point at which the frame is propped against the support. Also, these plates have four adjustment holes for 4 tilt angles.

The feature by which the frame tilt is adjusted and the frame collapsed also has been improved. In the FIG. 1 stand this requires pushing on the outside of the frame so as to compress it slightly and thus remove the leg extensions of the frame from the holes in the adjustment plates. This is improved by instead providing finger grabs on extensions of the support which fit into the adjustment plates. This allows easy removal of the support extensions from the adjustment plate holes.

Also, the end portions of the support extensions which fit into the holes in the adjustment plate have been provided with flanges so that they only enter the attachment plate holes to a predetermined extent.

Also in accordance with this invention, a new hand strap assembly for a portable computer allows use of such a computer at any orientation and with a variety of peripheral/accessory devices.

DETAILED DESCRIPTION

Desk Stand

Figure 1:
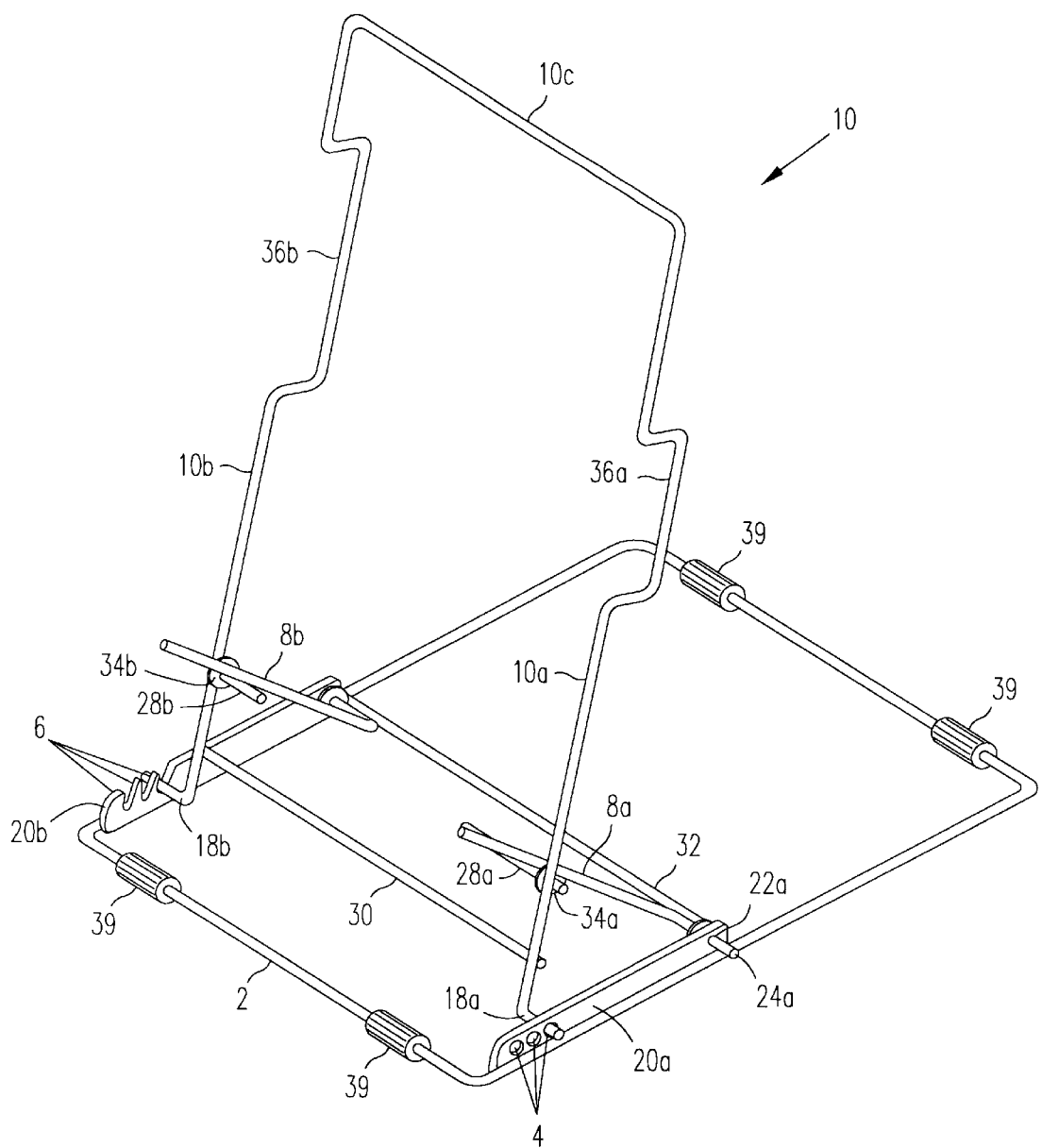
FIG. 1 shows a computer desk stand from a copending patent application.
Figure 2:
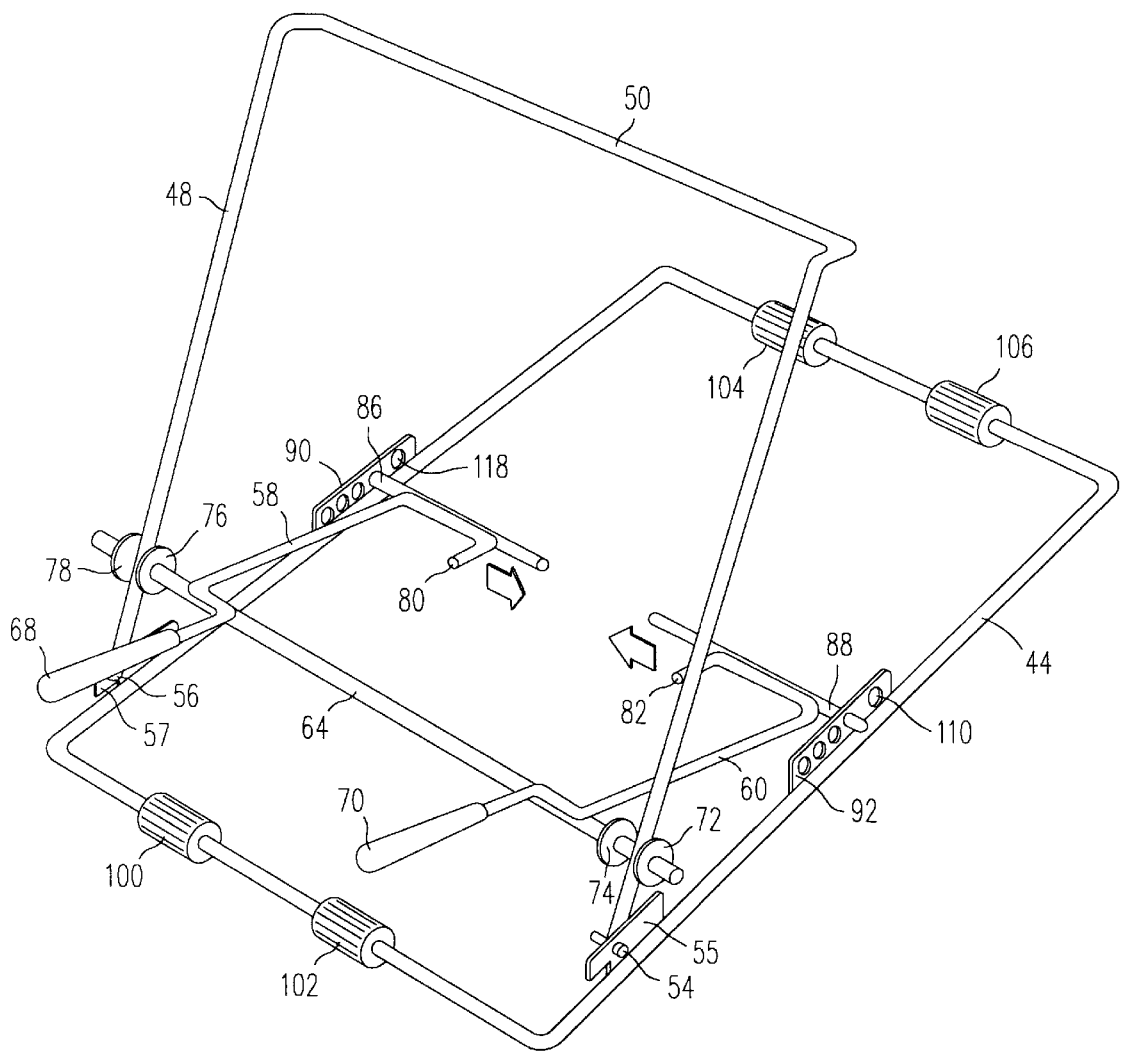
FIG. 2 shows a perspective view of the present desk stand.

FIG. 2 shows a perspective view of the present desk stand. It is to be understood that this stand is used for a portable computer, as described in the above-referenced copending patent application. The portable computer rests on the stand as described in further detail below.

The present desk stand includes a base 44 which rests for instance on a desk top. The frame 48 includes an upper cross bar 50 and two legs. The legs extend down to respectively pivot points 54, 56. This pivoting is for two reasons: first to provide adjustment of the tilt angle of the frame 48, and second to allow collapsing of the stand so that it lays flat for storage or carrying. The pivot points 54 and 56 are for instance of the type in the above-referenced copending application. Pivot points 54, 56 are located respectively in plates 55, 57.

The frame 48 is supported by two support legs 58 and 60, collectively referred to herein as the support. Support legs 58 and 60 are each rigidly attached (e.g. spot welded) to the lower cross bar 64 of the support. Support legs 58 and 60 each, in addition to being connected to the cross bar 64, terminate in computer supports 68 and 70 respectively. In use, the lower portion of the portable computer rests on computer supports 68 and 70. As shown, supports 68, 70 are padded so as to avoid scratching and slippage of the housing of the portable computer, although this is not necessary.

The cross bar 64 has at its ends dual washers 72, 74 and 76, 78 to which the vertical portions of frame 48 are attached, e.g. spot welded. The cross bar 64 pivots inside these two sets of dual washers. Hence, the dual washers 72, 74 and 76, 78 each function as bearings for cross bar 64. The rear portions of the support arms 58, 60 terminate respectively in finger grabs 80 and 82. These finger grabs, as shown by the arrows, are pushed inward by finger pressure to remove the support arm extensions 86 and 88 respectively from the attachment plate 90,92 holes which accommodate them. Thus use of the finger grabs 80, 82 allows either adjustment of the tilt angle of the frame 48 by use of the various holes in the adjustment plates 90 and 92, or collapsing of the entire frame 48 and support onto the base 44. This is better understood in light of the following description.

Also on the base 44 are four feet, including forward feet 100, 102 and rear feet 104, 106. The four feet are each held in position by crimps in base 44. (The crimps are shown in FIG. 4.)

Figure 3:
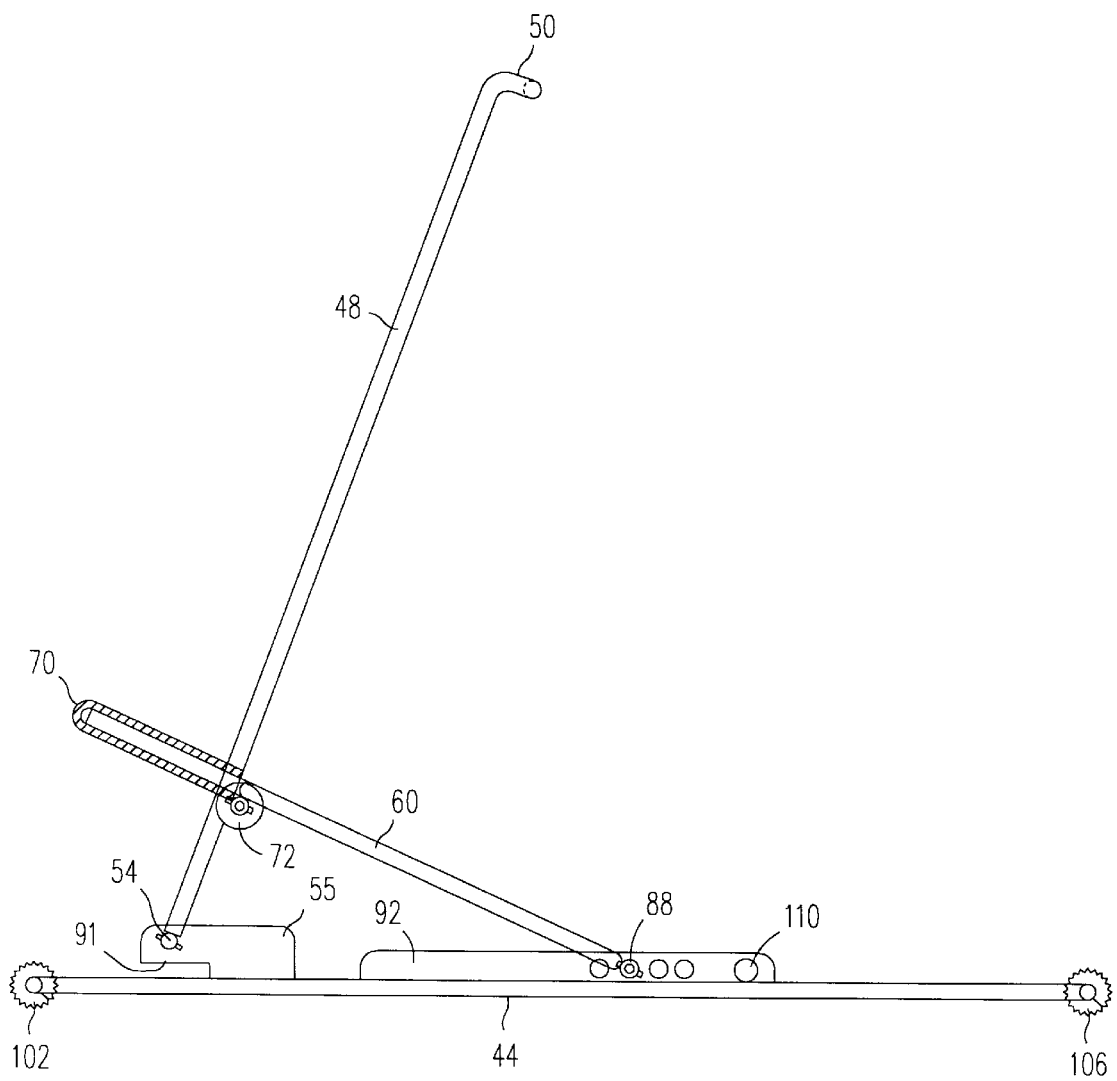
FIG. 3 shows a side view of the desk stand of FIG. 2.

FIG. 3 is a side view of the FIG. 2 desk stand; the only difference is that the support arm extension 88 is shown in a different attachment plate hole than it is in FIG. 2. This illustrates the frame adjustability by use of the holes in the attachment plate 92 and corresponding (invisible) attachment plate 90. The rearmost hole 110 accommodates the support arm extension 88 when the frame 48 is in its collapsed position. One other difference is that the computer support 70 in FIG. 3 is shown in cross section as being a bent wire structure whereas in FIG. 2 this structure is shown covered with for instance a soft rubber cover for protective purposes. FIG. 3 shows cut out 91 in pivot plate 55. A similar cut out is defined in pivot plate 57. These cut outs make pivot plates 55, 57 somewhat flexible, for manufacturing assembly purpose.

Figure 4:
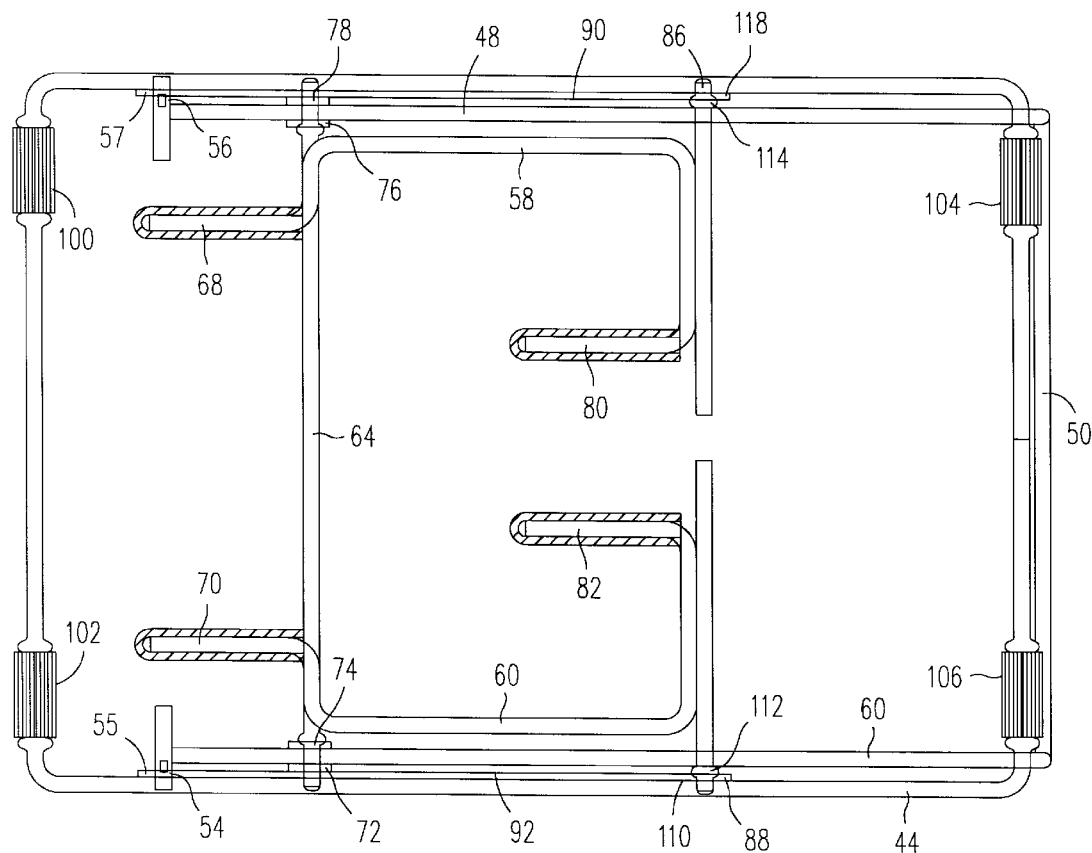
FIG. 4 shows a top view of the FIG. 2 desk stand in a collapsed position.
Figure 5:
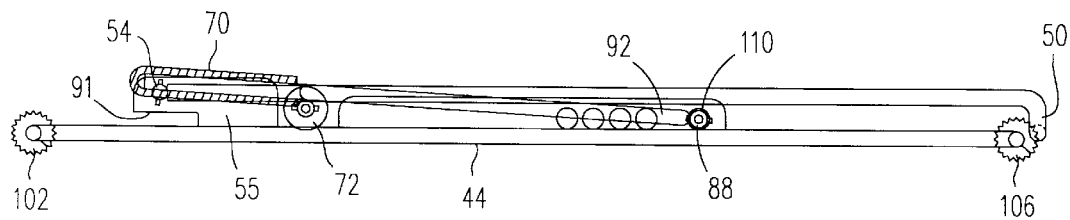
FIG. 5 shows a side view of the FIG. 4 desk stand in the collapsed position.

FIGS. 4 and 5 show respectively a top view and a side view of the structure of FIGS. 2 and 3 in the collapsed position. As can be seen, the support arm extension 88 is in the hole 110 which is the rearmost hole in the left side attachment plate 92. Support arm extension 88 defines a crimp 112 to prevent it from entering hole 110 too far; the other support arm extension 86 has a similar crimp 114. As better shown in the side view of FIG. 5, in the collapsed position this desk stand lies flat. Moreover, in the collapsed position the upper cross bar 50 of the frame 48 is in contact with the rear feet 106 and 104, thereby locking upper cross bar 50 in place and thereby locking the entire stand in the collapsed position. This locking is overcome to open up the stand by finger pressure on cross member 50.

In use, the portable computer has its side or edge resting on the computer supports 68 and 70 and its back resting on the frame 48. Alternatively, the portable computer hangs from the upper cross bar 50 by hooks or other means located on the rear surface of the computer or by hooks or other means located on an adaptor plate which is fastened to the rear of the computer. Alternatively, the portable computer is mated with an associated docking port which hangs by hooks etc. from the cross bar of frame 48, as described in the above-referenced application.

As depicted here the base, frame, and support are made of heavy gauge wire but this is not limiting. The other pieces are for instances stamped metal or other suitable materials. For actual use of this desk stand with an adaptor plate, computer or docking port, see the disclosure of the above-referenced patent application, incorporated herein by reference particularly FIGS. 2, 3, 4, 5, 6 and 10. The present desk stand is used in this respect identically in terms of supporting the computer or adaptor plate or docking port.

Use of this desk stand is readily understood with reference to FIG. 2. To collapse it from the upright position shown in FIG. 2, one unlocks the support arm extensions (also called locking pins) 86 and 88 by pushing, as shown by the arrows, the associated finger grabs 80 and 82 inwards. This removes the locking pins 86, 88 from their holes in the adjustment plates 90 and 92. The locking pins 86, 88 are then inserted into the rearmost holes 110, 118 shown in FIG. 2, at which point the frame 48 is collapsed to its folded position shown in top view in FIG. 5. The upper cross bar 50 is then pushed over the rear feet 104, 106 which lock to upper cross bar 50. Setting up the desk stand is merely the reverse of collapsing it.

Hand Strap Assembly

Hand held portable computers usually have a handstrap attached to their back surface. The user's non-writing (e.g. left) hand is inserted into the hand strap, palm to the back surface of the computer, with the other (right) hand used to operate the portable computer. Prior art hand straps exhibit several deficiencies. First, different straps are required for left/right hand use and portrait/landscape orientations of the computer. Prior art handstraps usually attach to handles extending from the computer's back surface, making use of peripheral devices/attachments such as a desk stand, docking port, or port replicator problematic.

Figure 6A:
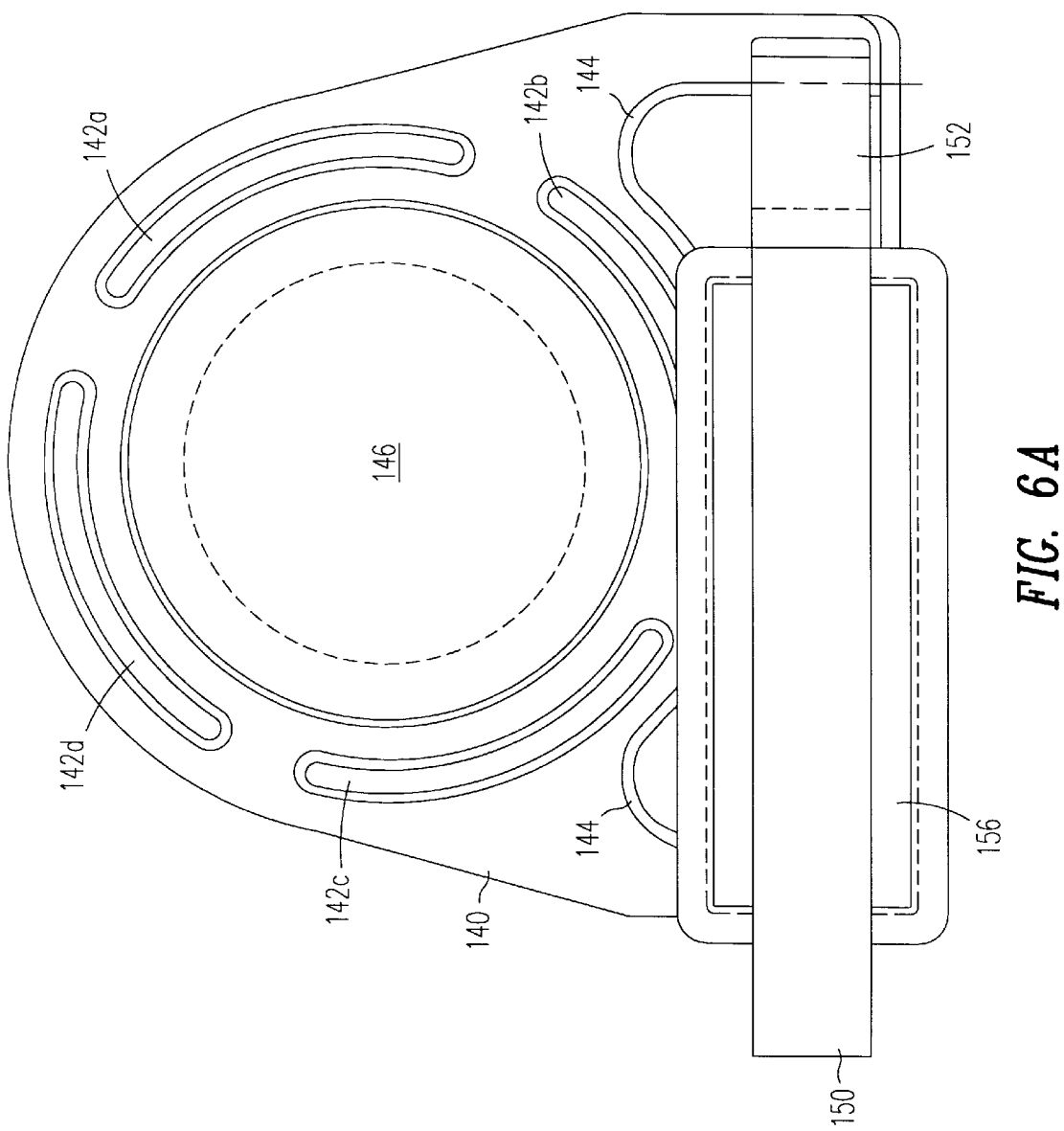
FIGS. 6A, 6B show the present portable computer hand strap assembly.

These problems overcome by the present hand strap assembly shown in FIG. 6A. (The associated computer is not shown in FIG. 6A). This assembly includes a rigid thin (e.g. plastic) bracket 140 defining four screw slots 142a, 142b, 142c, 142d, and a hand strap slot 144. A soft hand cushion 146 is e.g. glued to the central part of bracket 140. The actual hand strap includes a hand strap 150 which slides in slot 144. Strap 150 is e.g. webbing material sewn into a loop at end 152 and has a wider wrist pad 156 attached to it.

Figure 6B:
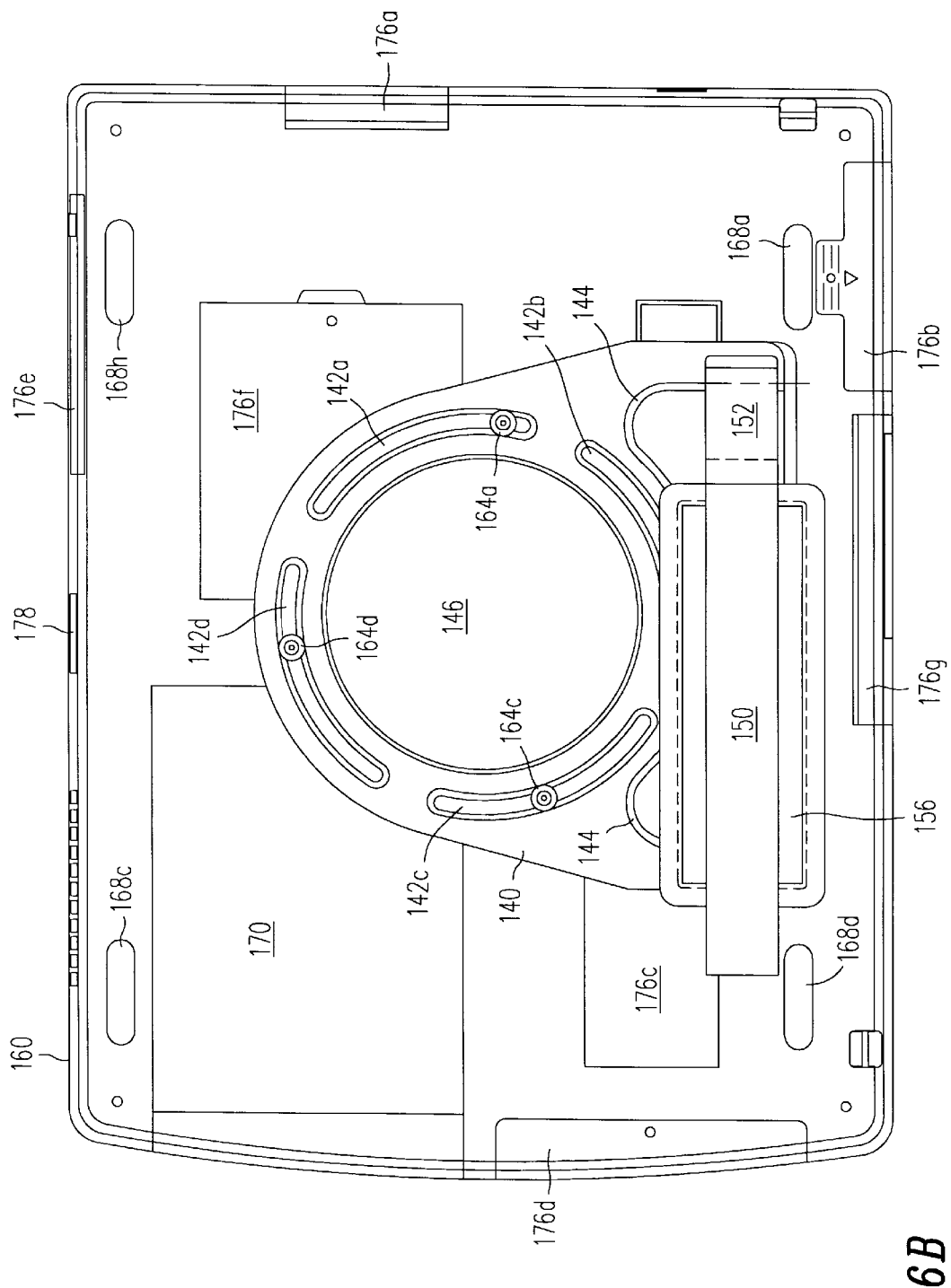

FIG. 6B shows the assembly of FIG. 6A installed on the back surface of a portable computer 160. Bracket 140 as attached to screw holes provided in the housing of computer 160 by screws 164a, 164b, 164c, 164d passing through respectively slots 142a, etc. (The screw 164b for slot 142b is hidden from view.) The other structures are conventional and include feet 168a, 168b, 168c, 168d; battery cover 170, and various access doors providing access to memory modules, ports, etc. For example, there is serial port 176a, radio door 176b, PCMCIA card door 176g, label 176c, hard disk drive door 176d, and memory module door 176f. Note also infrared detectors 178.

The user puts his non-writing hand through strap 150, with his wrist under pad 156 and his palm on cushion 146. Thus the front side of the computer is facing up. This hand strap assembly has three adjustment modes. For left hand/ right hand or portrait/landscape orientation, the bracket 140 can be rotated to four different positions by removing screws 164 etc. and rotating the entire bracket, and replacing the screws. For smaller "comfort" adjustments, the screws are loosened and bracket 140 rotated using slots 142*a* etc., then the screws retightened. This allows adjustment over a range of about 50° (the arc of slots 142*a* etc.) Also, the strap 150 can slide along its slot 144 to accommodate the change in orientation of bracket 140. (Note that slot 144 extends to the left side of bracket 140 in FIG. 6B.) Thus this single hand strap assembly accommodates a full range of orientation of use of computer 160. The length of strap 150 is adjustable also. Since this assembly does not require any protruding mounting handles on the back of computer 160, it does not interfere with use of associated peripheral/accessory devices such as the above described disk stand or a port replicator or docking port, for non-handheld (desk top) use.

This disclosure is illustrative and not limiting; further modifications will be apparent to one skilled in the art in the light of this disclosure and are intended to fall within the scope of the appended claims.

We claim:

1. An apparatus for supporting a portable computer comprising:

a base;

a frame hinged to the base;

a support pivoted to the frame and extending to the base, thereby to prop the frame at an angle to the base;

wherein the base includes first and second adjustment plates, each extending behind the frame in a propped position of the frame, the first and second adjustment plates respectively accommodating lower first and second portions of the support;

wherein the support further comprises a support member extending in front of the frame in a propped position of the frame, the support member providing support for the portable computer in a propped position of the frame.

2. The apparatus of claim 1, wherein the first and second adjustment plates each having a plurality of holes formed therein, the holes accommodating the lower first and second portions of the support, the holes formed in the first adjustment plate are aligned with the holes formed in the second adjustment plate to accommodate the insertion of the lower first portion of the support in one of the holes formed in the first adjustment plate simultaneously with the insertion of the lower second portion of the support in a corresponding one of the holes formed in the second adjustment plate, thereby allowing propping of the frame at a plurality of angles to the base.

3. An apparatus for supporting a portable computer comprising:

a base;

a frame hinged to the base;

a support pivoted to the frame and extending to the base, thereby to prop the frame at an angle to the base;

wherein the base includes first and second adjustment plates, each extending behind the frame in a propped position of the frame, the first and second adjustment plates respectively accommodating lower first and second portions of the support;

wherein each adjustment plate defines a plurality of openings, each accommodating the lower first and second portions of the support, thereby allowing propping of the frame at a plurality of angles to the base; and wherein the lower first and second portions of the support each include an extension adapted for exerting finger pressure on the lower first and second portions to remove the lower first and second portions from the associated openings by compressing the support.

4. An apparatus for supporting a portable computer comprising:

a base;

a frame hinged to the base;

a support pivoted to the frame and extending to the base, thereby to prop the frame at an angle to the base; and at least one foot structure on the base, wherein in a collapsed position of the frame, a portion of the frame bears against the foot structure, thereby locking the frame to the base;

wherein the base includes first and second adjustment plates, each extending behind the frame in a propped position of the frame, the first and second adjustment plates respectively accommodating lower first and second portions of the support; the first and second adjustment plates each having a plurality of holes formed therein, the holes accommodating the lower first and second portions of the support.

5. An apparatus for supporting a portable computer comprising:

a base;

a frame hinged to the base;

a support pivoted to the frame and extending to the base, thereby to prop the frame at an angle to the base;

wherein the base includes first and second adjustment plates, each extending behind the frame in a propped position of the frame, the first and second adjustment plates respectively accommodating lower first and second portions of the support; the first and second adjustment plates each having a plurality of holes formed therein, the holes accommodating the lower first and second portions of the support;

an enlarged portion on each of the lower first and second portions of the support to limit an amount by which each of the lower first and second portions respectively extends into the holes in the first and second adjustment plates.

* * * * *